(No Model.) 8 Sheets—Sheet 1.

R. WEISS.
CIRCULAR LOOM.

No. 590,122. Patented Sept. 14, 1897.

Witnesses:
Thomas Durant
Wallace Murdock

Inventor.
Rudolph Weiss,
by Church & Church
his Attys.

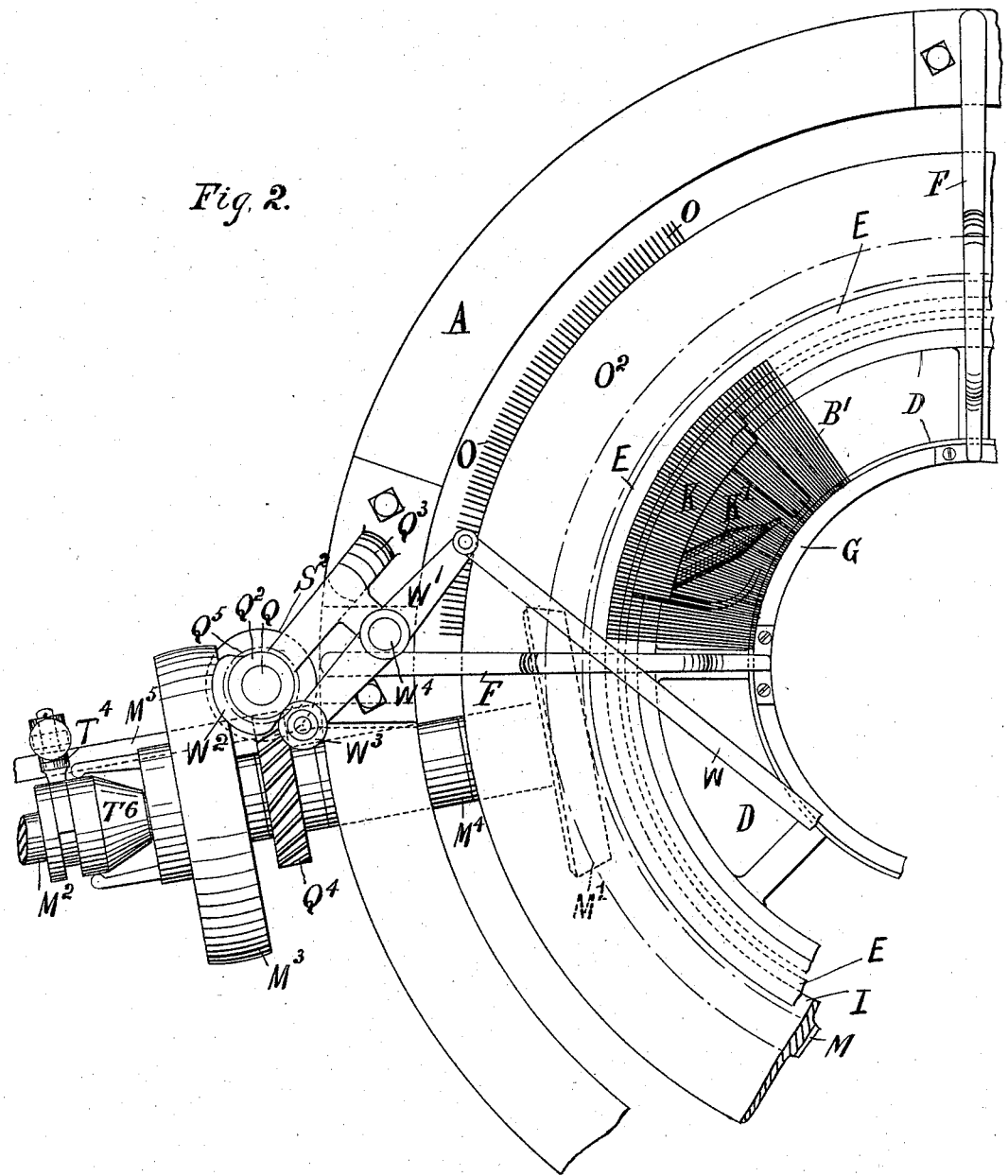

(No Model.)
8 Sheets—Sheet 4.
R. WEISS.
CIRCULAR LOOM.
No. 590,122. Patented Sept. 14, 1897.
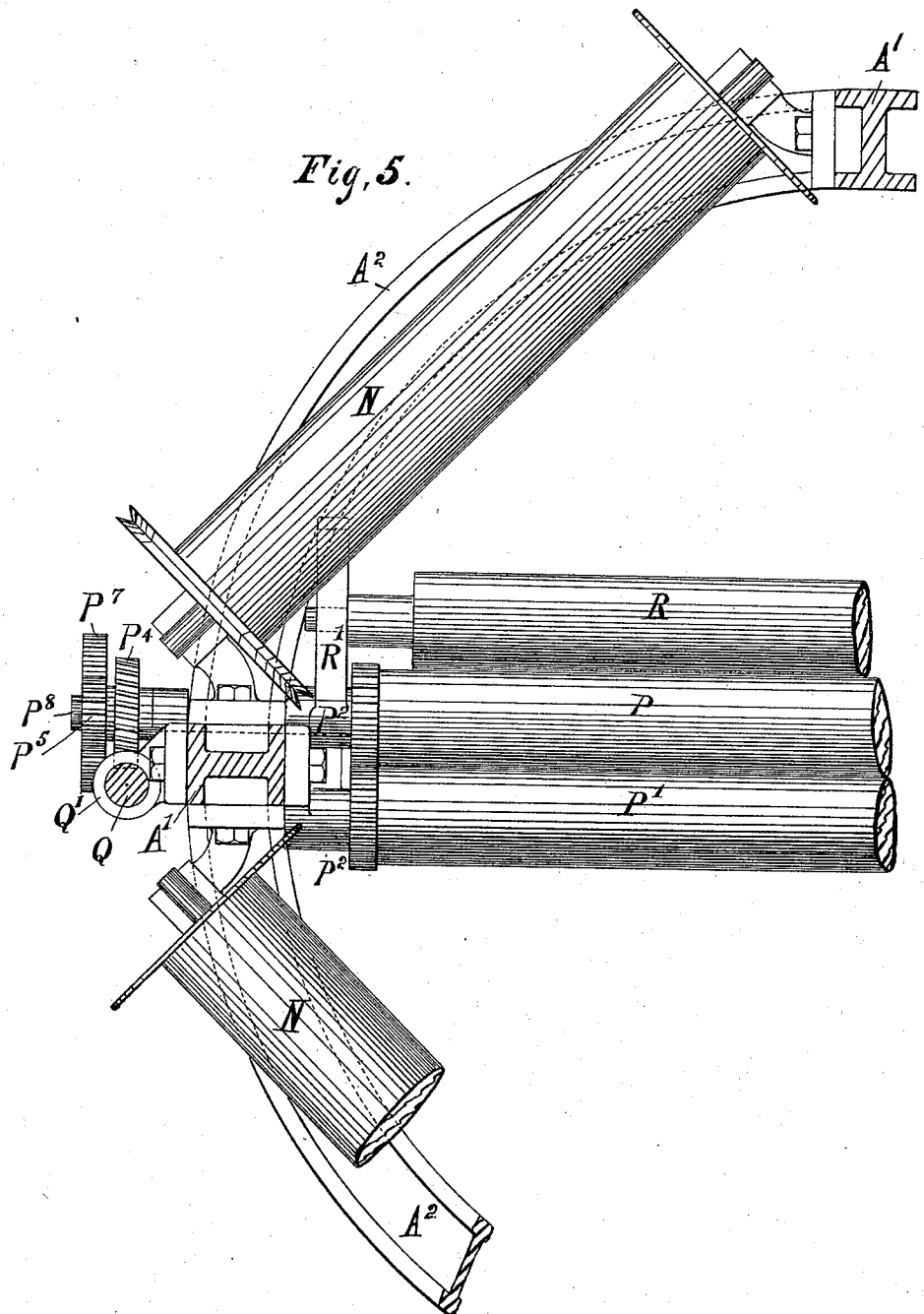
Witnesses:
Thomas Durant
Wallace Murdock
Inventor:
Rudolph Weiss,
by Church & Church
his Attys.

(No Model.) 8 Sheets—Sheet 5.
R. WEISS.
CIRCULAR LOOM.
No. 590,122. Patented Sept. 14, 1897.
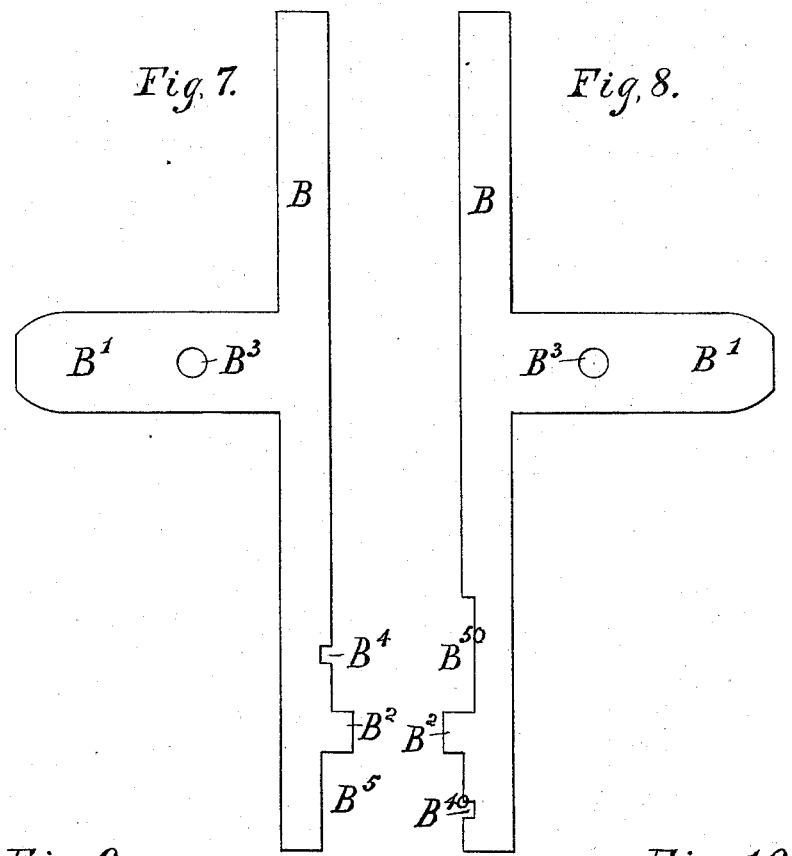
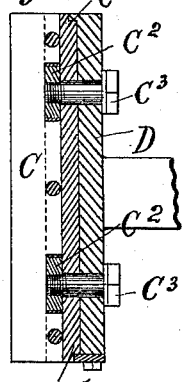
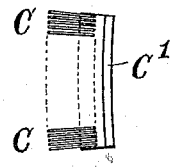
Witnesses:
Thomas Durant
Wallace Murdock
Inventor:
Rudolph Weiss,
by
Church & Church
his Attys.

(No Model.) 8 Sheets—Sheet 6.
R. WEISS.
CIRCULAR LOOM.
No. 590,122. Patented Sept. 14, 1897.
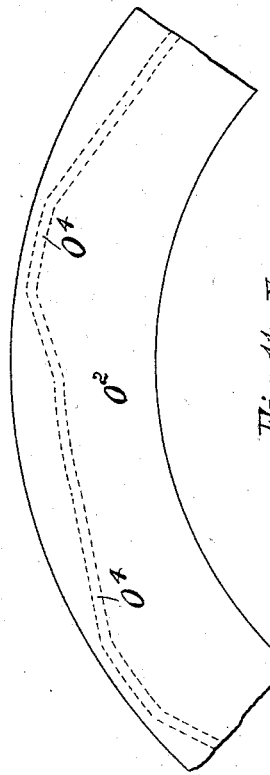
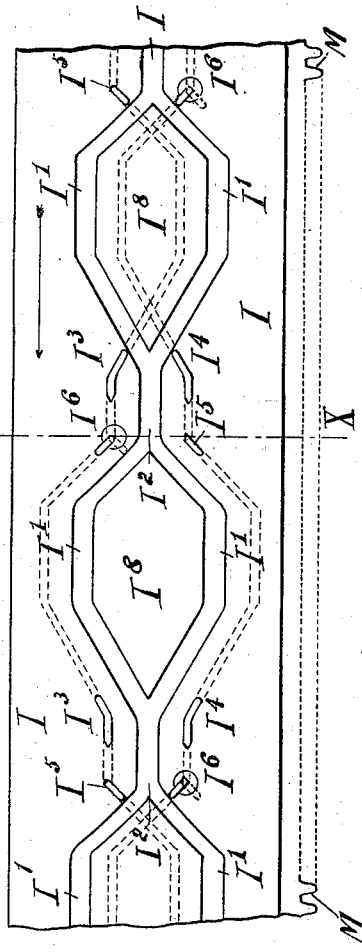
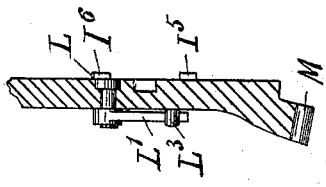
Witnesses:
Thomas Durant
Wallace Murdock
Inventor:
Rudolph Weiss,
by Church & Church
his Attys.

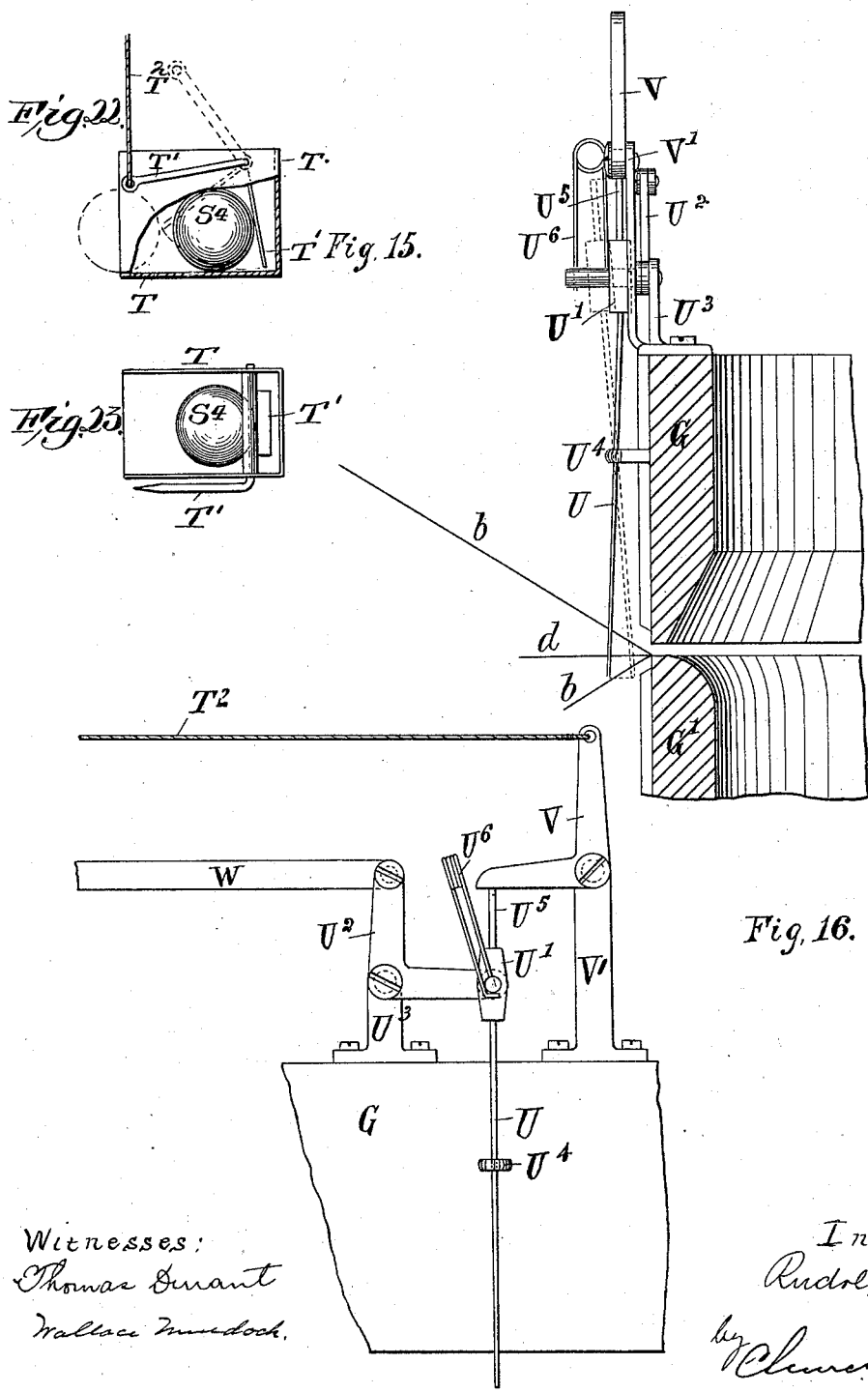

(No Model.) 8 Sheets—Sheet 8.
R. WEISS.
CIRCULAR LOOM.
No. 590,122. Patented Sept. 14, 1897.
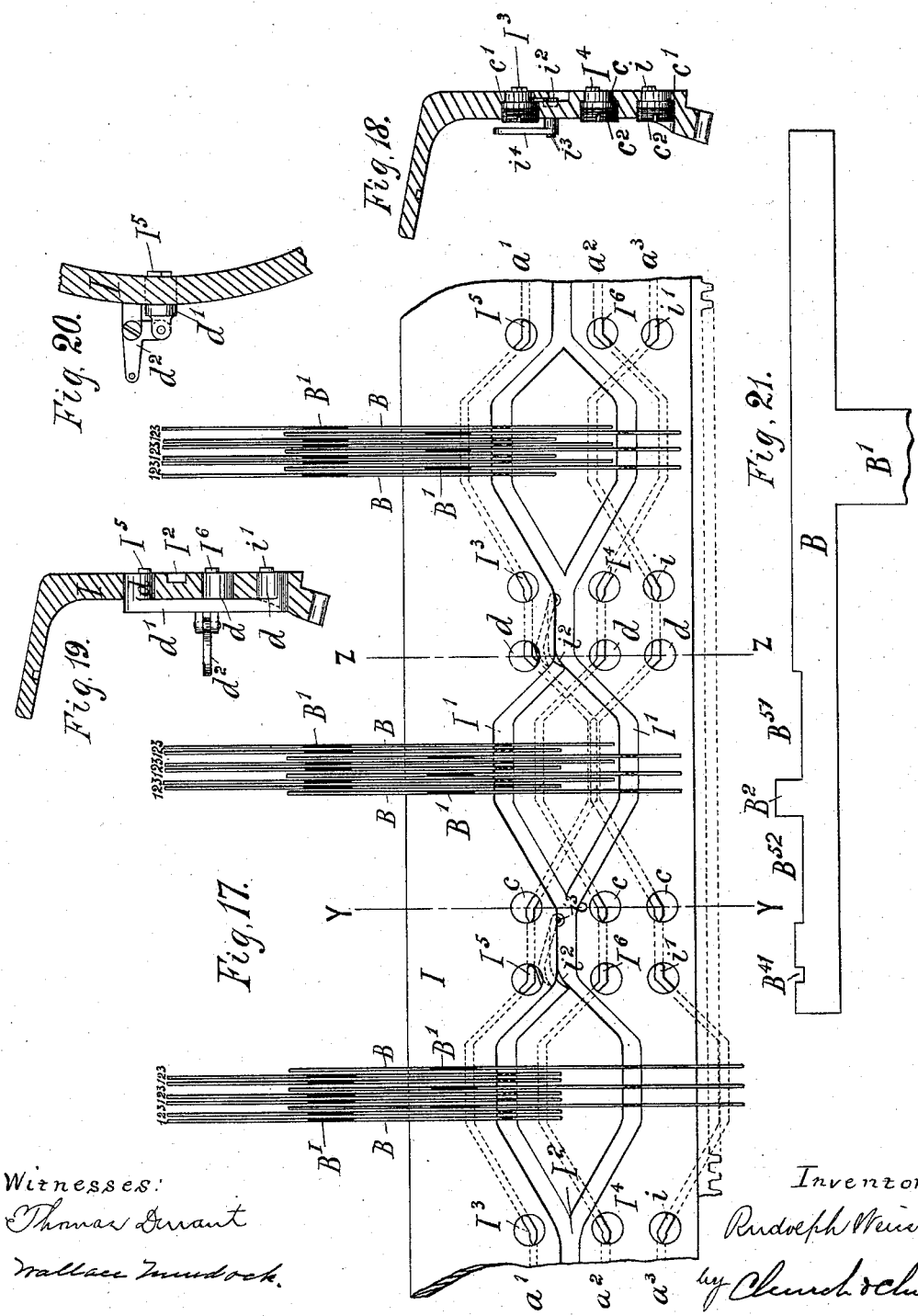

UNITED STATES PATENT OFFICE.

RUDOLPH WEISS, OF NOTTINGHAM, ENGLAND.

CIRCULAR LOOM.

SPECIFICATION forming part of Letters Patent No. 590,122, dated September 14, 1897.

Application filed July 23, 1895. Serial No. 556,918. (No model.)

*To all whom it may concern:*

Be it known that I, RUDOLPH WEISS, a citizen of the Swiss Republic, residing at Nottingham, England, have invented certain new and useful Improvements in Circular Looms, of which the following is a specification.

This invention relates to circular looms such as described in the specification of British Letters Patent No. 888, of January 17, 1891, in which the shuttles are propelled continuously in a circular path by means of sliding jacks provided with projections which act on the inclined surfaces at the rear of the shuttle.

It will be best understood by reference to the accompanying drawings, in which—

Figure 1:
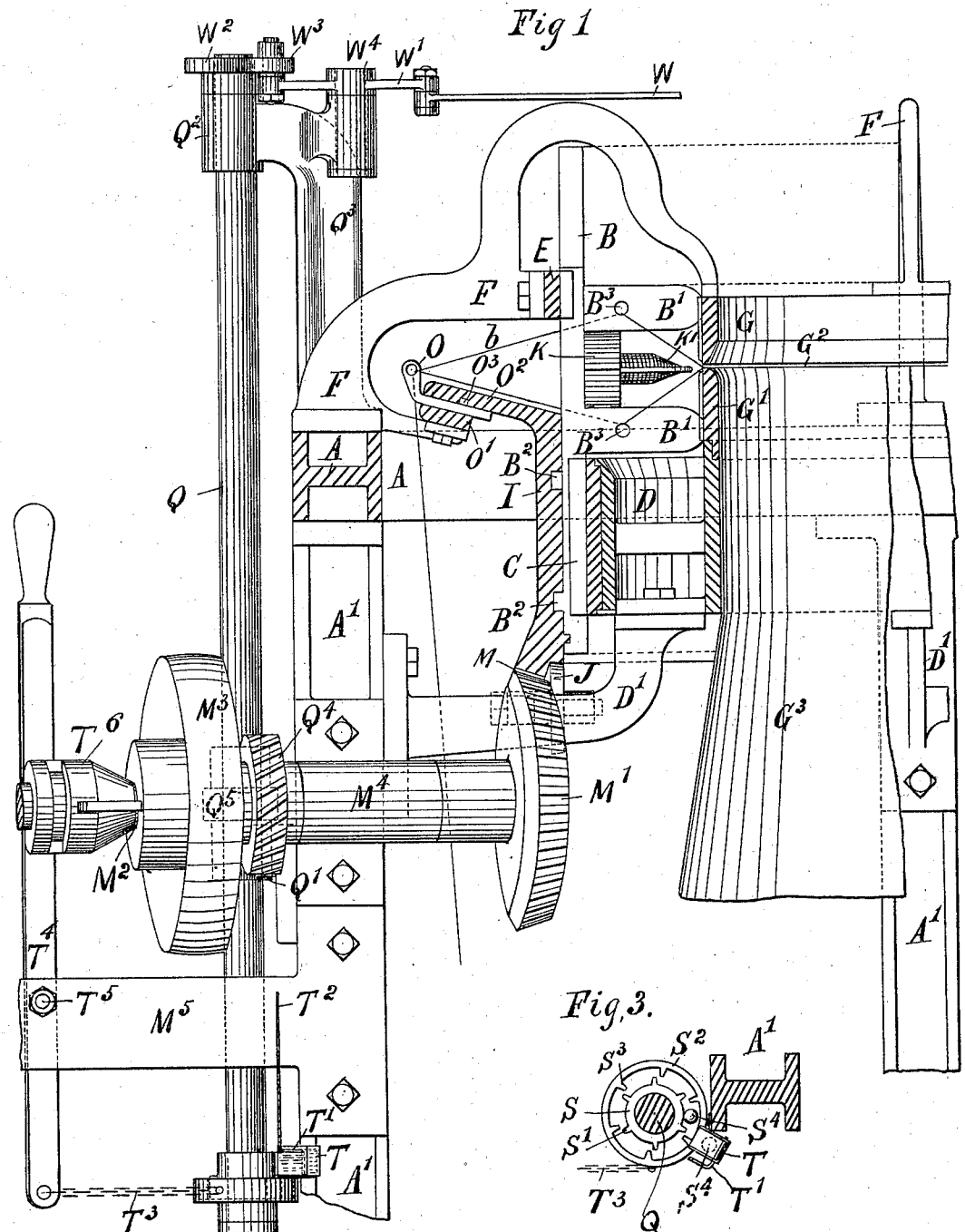
Figure 3:
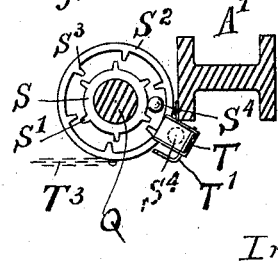
Figure 4:
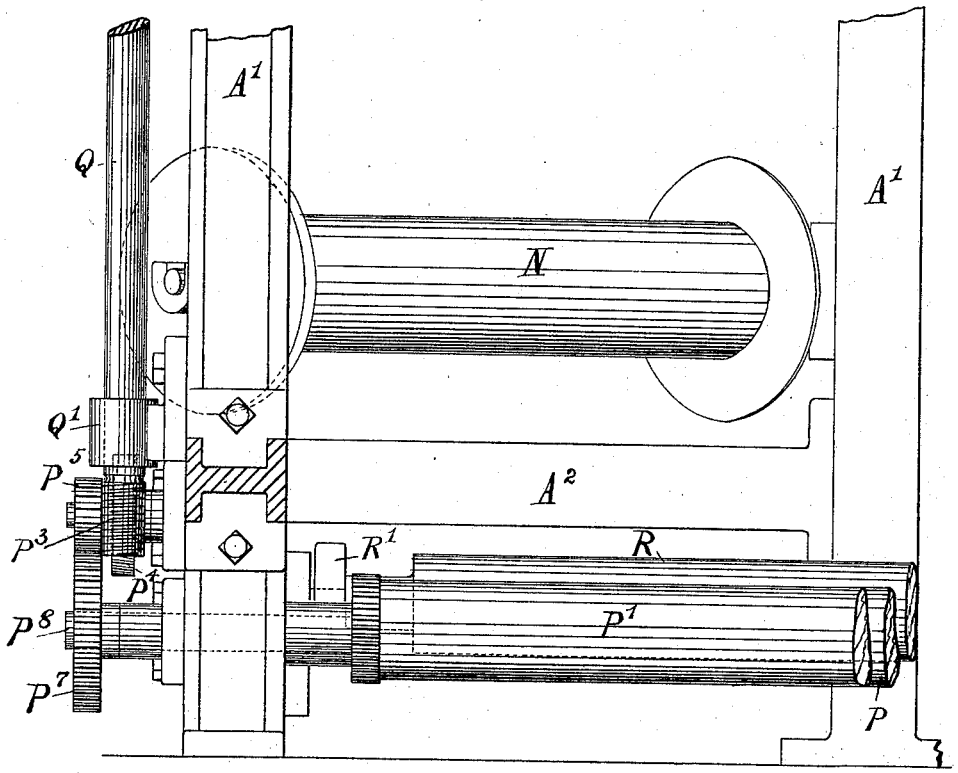
Figure 6:
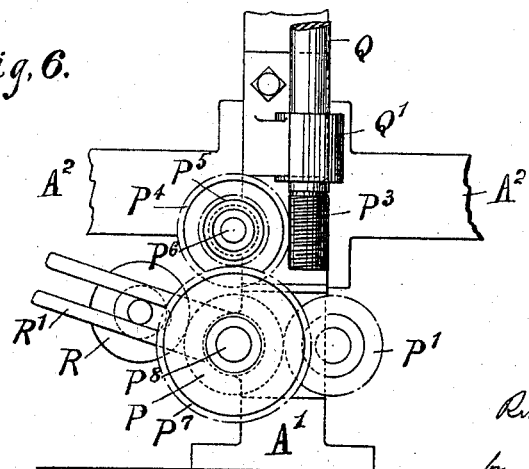

Figure 1 is a sectional elevation, and Fig. 2 a plan, of a segment or portion of the upper part of the loom. Fig. 3 is a plan showing detail of part of Fig. 1. Fig. 4 is a sectional elevation, and Fig. 5 a plan, of the lower part of the loom corresponding to that shown in Figs. 1 and 2. Fig. 6 is an end elevation of the take-up rollers and work-beam. Figs. 7 and 8 are views showing the construction of alternate sliding jacks for effecting the shuttle propelling and shedding motion. Fig. 9 is a sectional elevation, and Fig. 10 a plan, of a segment of the combs for carrying the sliding jacks. Fig. 11 is projection of the cam-race for operating the sliding jacks. Fig. 12 is a vertical section of the cam race or ring, taken on line X X of Fig. 11. Fig. 13 is a projection of part of the cam-race for operating the warp-take-up jacks corresponding to that shown in Fig. 11 for operating the shuttle-propelling jacks. Fig. 14 is an elevation showing further detail of the construction of the cam-ring for operating the shuttle-propelling jacks. Fig. 15 is a side elevation, and Fig. 16 a front elevation, showing weft-stop mechanism. Fig. 17 is a projection of a cam race or ring for operating the sliding jacks provided with additional switches and illustrating the use of such switches. Figs. 18 and 19 are vertical sections of the cam race or ring, taken, respectively, on lines Y Y and Z Z of Fig. 17. Fig. 20 is a plan showing further detail of the cam race or ring shown in Fig. 17. Fig. 21 is a view showing a sliding jack employed in connection with the additional cam-switches. Fig. 22 is an elevation, and Fig. 23 a plan, of the box or chute for holding the ball or solid object. Figs. 7, 8, 9, 10, and 21 are drawn to a larger scale than Figs. 1 to 6, 11 to 14, and 17 to 20, all inclusive.

Like letters and figures indicate like parts throughout the drawings.

The framing of the loom (see Figs. 1, 2, 4, and 5) comprises a circular rail A, carried by vertical supports A', which are connected to each other near their lower ends by segmental stays A².

The sliding jacks B, Figs. 1 and 2, forming the shuttle race or support and performing the shuttle-propelling, the shedding motion, and the beating up are arranged, as shown, concentric with the axis of the loom and also reciprocate in a direction parallel to the said axis, or nearly so, instead of radially, as described in the specification of Letters Patent previously cited.

By arranging the jacks B to reciprocate parallel to the axis of the loom every part of the jacks and their supporting-rings may be arranged on the exterior of the cloth-line— that is, in a space of greater diameter than the cloth-line—and consequently the jacks and their supporting-combs may be made stronger in proportion to the gage of the loom. The combs for supporting the jacks are also necessarily parallel instead of being thinner at their inner than at their outer ends, as is the case in a loom where the jacks are arranged to reciprocate radially.

The jacks B are carried between combs or plates C, secured to the exterior of the double ring or annular casing D, which latter is supported on brackets D', secured to the vertical supports A' of the framing.

The combs or plates C (see Figs. 9 and 10) are cast into a foundation C', of soft metal, in segments, into each of which segments are also cast, preferably, two screwed nuts or plates C² for engaging with screws C³, by means of which each segment is secured to the ring D.

The upper ends of the jacks B (see Figs. 1 and 2) are guided in recesses in the inner face of a ring E, which is supported by brackets F, secured to the circular rail A of the framing.

The projections B' on the jacks B for supporting and propelling the shuttles project toward the center of the loom and their extreme ends are supported in tricks or recesses in two rings G G', arranged above and below the cloth-line, respectively, with an intervening space $G^2$ for the passage of the cloth $G^3$.

The ends of the projections B' are preferably formed of sufficient width to bridge the space $G^2$, so that they may engage with the recesses in one ring before they leave the recesses in the other and are thus supported when crossing the space $G^2$ or cloth-line.

By supporting the ends of the projections B', as described, they are effectively prevented from being forced out of their relative positions and from being caused to strike or engage with each other as they cross by reason of the pressure they exert on the inclines at the rear of the shuttles. The jacks B, by having their projections B' supported, may also be made of a finer gage, and looms for the production of fine-gaged fabrics may be thus constructed. The length of the projections B' may also be increased, so as to give more space in the shuttle-race, and the cop K' of each shuttle K—as shown, for example, in Figs. 1 and 2—may be placed diagonally across it in plan, and may thus be longer and of greater capacity in proportion to the length of the shuttle.

The ring G is secured to the bracket F and the ring G' to the inner part of the double ring or annular casing D, hereinbefore described. The inner face of one of these rings G or G' also forms a cloth-ring, the cloth being carried upward or, as shown in the drawings, downward, as preferred, the position of the take-up and work rollers being arranged accordingly.

The jacks B are inclosed and retained in the combs C by a cylindrical cam-ring I, the lower edge of which is mounted on antifriction-rollers J, pivoted to the bracket D'. This cam I is provided with cam-races in its inner face to receive the nibs or projections $B^2$ on the jacks B, by means of which the latter are operated.

The cam-ring I (see Fig. 11) is divided into the same number of equal parts as there are shuttles employed (only one shuttle is shown in Figs. 1 and 2, but any desired number may be used) and the cam-races in all the parts are identical.

Each part of the cam-ring is formed with two races I' I', which open out from and again return to a central race $I^2$, the latter alternating with the two former, as shown all round the cam-ring.

In order to effect both the shuttle-propelling and the shedding motion the jacks B, Fig. 1, which are provided with holes or warp-eyes $B^3$, must be operated so that the extensions B', in which are formed holes or warp-eyes $B^3$ for the passage of the warp-threads $b$ in the interval between the passage of the shuttles K, must move across the path of the said shuttles, every alternate jack moving in the reverse direction to the remainder.

The movement of the jacks is as follows: The projections B' of those jacks immediately in the rear of each shuttle are successively moved from opposite sides into the center of the path of the shuttle-race and their edges acting on the double inclined surfaces at the rear of the shuttle K propel it forward. The jacks then remain in this position until sufficient length of weft-thread is inserted, when they continue their movement until the projections B' reach the position on the reverse side of the path of the shuttle and thus perform the shedding motion for the insertion of the weft-thread of the next shuttle. At the same time the extreme ends of the projections B' beat up the weft-thread that has been inserted by the shuttle in its passage. The jacks B and their projections B', it will also be seen, in addition to performing the shuttle-propelling, the shedding motion, and the beating up, also form the shuttle-race or shuttle-supporting mechanism.

As the cam-ring I (see Fig. 11) moves in the direction indicated by the arrow the nibs of the jack move from both races I' I' into the central race $I^2$, and in order to divide them again as the cam-ring continues its movement, so that alternate jacks shall be operated by the upper and lower cam-races, respectively, as required, I employ the following arrangement:

Every alternate jack (see Fig. 7) is formed with a recess $B^4$ above the nib $B^2$ and a part cut away at $B^5$ below the nib $B^2$. The remaining jacks (see Fig. 8) are formed with a recess $B^{40}$ below the nib $B^2$ and a part cut away at $B^{50}$ above the nib $B^2$.

The cam-ring I (see Fig. 11) is provided at the point where the central race $I^2$ opens out into the two races I', with projecting cam surfaces or switches $I^3$ $I^4$ arranged above and below the central race $I^2$, respectively. These switches $I^3$ $I^4$ engage with the recesses $B^4$ $B^{40}$ in the jacks B, the switches $I^3$ operating those jacks with a recess $B^4$ above the nib $B^2$ and missing those with the corresponding part $B^{50}$ cut away, while the switches $I^4$ operate those jacks with a recess $B^{40}$ below the nib $B^2$ and miss those with the corresponding part $B^{50}$ cut away. It will thus be seen that by means of the switches $I^3$ $I^4$ every alternate jack B may be placed so that their nibs $B^2$ are engaged by the upper race I', and the remainder so that their nibs $B^2$ are engaged by the lower race I'. This order may also be reversed every division of the cam, as required for the shedding motion—that is to say, those jacks operated by the upper cam-race I' in one division or for the shuttle are operated by the lower cam-race I' in the next division or for the next shuttle by placing the switches $I^3$ $I^4$ in the reverse positions as shown for each division.

It will be understood that the nibs $B^2$ are all the same distance from the projections $B'$ in the whole of the jacks B the projection of the cam-races I $I'$ $I^2$ (subject to the difference between the width of the cam-races and the projections $B'$) represent the position of the projections $B'$ of the jacks and the spaces $I^8$ between the races $I'$ represent the spaces between the projections $B'$ of alternate jacks occupied by the shuttles, and as the cam moves forward the shuttle-space also moves forward, the projections $B'$ opening out in front and closing in on the rear of the shuttles and moving them forward with the cam. The length of the central race $I^2$ also represents the space of time during which the jacks with their projections $B'$, together with the warp-thread which they operate, are retained in the center of the path of the shuttle after the insertion of a weft-thread and prior to the completion of the shedding motion for the insertion of the next weft-thread and the beating-up operation. With this arrangement less tension than has hitherto been necessary is required on the shuttle-thread, as sufficient length of weft-thread is laid in advance of the completion of the shedding motion to prevent the warp-threads at the completion of their shedding motion drawing off more weft than is required and a more perfect fabric may be produced.

In addition to the switches $I^3$ $I^4$ the cam-ring I is provided with fixed switches $I^5$, alternating above and below the central race $I^2$ and corresponding pivoted switches $I^6$. These switches come into operation when the cam-ring is moved in the reverse direction to that indicated by the arrow, and by adjusting the pivoted switches $I^6$ in the position shown in dotted lines and turning the cam-ring in this reverse direction the whole of the jacks B may be moved into the lower position to admit of the shuttles being removed.

The switches $I^6$ are mounted on pivots L, (see Figs. 12 and 14,) passing through the body of the cam-ring I, and at the external end these pivots are provided with arms $L'$, by means of which the switches may be adjusted.

The whole of the arms $L'$ in the cam-ring may be connected by a flexible connection $L^2$, so that the whole of the switches may be simultaneously adjusted. Stops $L^3$ may be also provided and springs $L^4$, the latter to hold the arms $L'$ against the stops and retain the switch in the required position. The flexible connections may also be provided with springs to maintain them in tension.

The cam-ring I (see Figs. 1, 2, 11, and 12) is provided with teeth M, which engage with a pinion $M'$, secured to the driving-shaft $M^2$, by means of which the cam-ring is rotated. The shaft $M^2$ is provided with a driving-pulley $M^3$ and is journaled in a bearing $M^4$, secured to one of the vertical supports $A'$, and a bearing (not shown) carried by the bracket $M^5$, secured to the same vertical support.

The warp-threads b in passing from the warp-beams N (see Figs. 4 and 5) to the jacks B are each carried through a hole in a take-up jack O. (See Figs. 1 and 2.) These jacks O are carried in tricks or recesses in a circular ring $O'$, secured to the brackets F, and are operated by a cam-ring $O^2$, secured to or forming part of the cam-ring I and provided with a cam-race to engage with the nibs $O^3$ of the take-up jacks.

The cam-race $O^4$ (see Fig. 13) is arranged as shown, so as to successively operate each take-up jack in order to take up the slack of the warp-threads b at the time the warp-threads are crossing and performing the shedding motion and also give the requisite tension to the warp-threads at different points necessary for the production of a regular fabric.

The cloth $G^3$, as it is produced, is carried inside the ring $G'$ and down to the two take-up rollers P $P'$ at the lower part of the loom. (See Figs. 4, 5, and 6.) The two take-up rollers P $P'$ are carried in bearings $P^2$, secured to the adjacent vertical supports $A'$. Motion is imparted to the roller P by a worm $P^3$ on a vertical shaft Q through the worm-wheel $P^4$ and pinion $P^5$, mounted on a pivot $P^6$, which latter is secured to the vertical support $A'$, and a toothed wheel $P^7$, secured to the shaft $P^8$ of the roller P.

The cloth G is delivered from the rollers P $P'$ onto the cloth-beam R, carried in slotted arms $R'$, secured to or formed by extensions of the bearings $P^2$.

The vertical shaft Q is carried in a bearing $Q'$, secured to the vertical support $A'$, and a bearing $Q^2$ in a bracket $Q^3$, secured to the circular rail A. (See Figs. 1 and 2.) Rotary motion is imparted to the shaft by helical toothed wheels $Q^4$ $Q^5$, secured, respectively, to the driving-shaft $M^2$ and the shaft Q.

On the shaft Q is secured a wheel S, (shown in plan in Fig. 3,) provided with cogs or projections $S'$ on its periphery. This wheel rotates within an annular wheel $S^2$, provided with corresponding internal projections $S^3$. The wheel $S^2$ is mounted loosely on the shaft Q and only receives motion therefrom when a solid object, such as a ball $S^4$, is dropped into the space between the two wheels S $S^2$.

Above the wheels S $S^2$ is a box or chute T, containing a ball $S^4$, (shown in dotted lines in Fig. 3,) and this ball is pushed from the box into the wheels by a lever $T'$, (part of which is within the box and is shown in Figs. 22 and 23,) operated by a cord, chain, or the like $T^2$, connected to the weft-stop mechanism.

That part of the lever $T'$ contained within the box or chute T corresponds in form to the depth and width of the interior of the box or chute T, and it is pivoted at its upper end in the sides of the box. When the cord $I^2$, which is connected to the end of that part of the lever which is on the exterior of the box, is pulled, the lower end of the interior part moves forward about the point at which it is pivoted and the ball $S^4$, which is placed in the bottom of the box T, is pushed out at the open end.

The annular wheel $S^2$ is connected by a chain $T^3$ to the lower end of the stopping and starting lever $T^4$, pivoted at $T^5$ to the bracket $M^5$, and actuating the sliding cone $T^6$ for operating the frictional grip of the driving-pulley $M^3$. When the ball $S^4$ is therefore moved out of the box T and falls between the wheels $S\ S^2$, motion being imparted to the latter, it winds up the chain $T^3$ and reverses the position of the lever $T^4$, and thus releases the frictional grip of the pulley $M^3$ and stops the loom immediately.

The weft-stop mechanism (see Figs. 15 and 16) is mounted on the ring G, preferably at a point where a space is left in the warp-threads for the formation of the selvages. It comprises a needle or rod U, secured to a block $U'$, which is pivoted to one end of a bell-crank lever $U^2$, mounted on a bracket $U^3$, secured to the ring G. The lower end of the rod U is alternately inserted across the shed, so that the weft-thread $d$ is laid on it, and withdrawn to allow the weft-thread to be beaten up.

Between the block $U'$ and the lower end of the rod U the latter is fulcrumed in a stud $U^4$ on the ring G, and it is moved from its normal position about this fulcrum by the pressure of the weft-thread $a$ on its lower end into the position shown in dotted lines prior to its withdrawal, so that its upper end $U^5$ misses the end of the bell-crank lever V.

The rod U is held in its normal position by the spring $U^6$, and if the weft-thread therefore fails it is moved to its normal position instead of that shown in dotted lines, and its upper end engages with the end of the bell-crank lever V, which is pivoted to the bracket $V'$, secured to the ring G. The upper end of the lever V is connected by the flexible connection $T^2$ to the before-described lever $T'$ of the box T, containing the ball $S^4$, which latter is thus ejected from the box into the space between the wheels $S\ S^2$, and through the consequent operation of the lever $T^4$ and cone $T^6$ the loom is immediately stopped.

The bell-crank lever $U^2$ for reciprocating the rod U is connected by a connecting-rod W to the inner end of a lever $W'$, (see Figs. 1 and 2,) pivoted at $W^4$ to the bracket $Q^3$, and this lever $W'$ is operated by a cam $W^2$ on the shaft Q in peripheral contact with an antifriction-roller $W^3$ on the outer end of the said lever.

The hereinbefore-described arrangement of the sliding jacks and switches is applicable for the production of plain fabrics in which alternate warp-threads are always disposed in opposite walls of the shed for insertion between them of the weft-thread of each shuttle. By employing additional switches, however, and sliding jacks adapted to engage with these additional switches I am enabled to produce what are known as "twills," "diagonals," and other fancy effects or materials, and also to produce patterns in colors by employing threads of different colors.

In Fig. 17 part of the jacks B are shown in connection with the projections of the cam-races $I'\ I^2$, and are arranged, for example, in groups of three, as indicated by the figures. The third jack in each group is formed, as shown in Fig. 21, with a part cut away at $B^{51}$ above the nib $B^2$ to miss the switch $I^3$, a second part $B^{52}$ cut away below the nib $B^2$ to miss the switch $I^4$, and with a recess $B^{41}$ to engage with the additional switch $i$ (Figs. 17 and 18) in the cam-race, the first and second jacks in each group being operated by the switches $I^3\ I^4$, respectively, as in the previous arrangement for plain fabrics.

The sets of switches $I^3$, $I^4$, and I, as shown for the three succeeding shuttles, are arranged to produce a two-to-one diagonal cloth or fabric in which there are two warp-threads in one wall of the shed to one in the other wall.

The position of each warp-thread is determined by the position of the corresponding jack projections $B'$, operating the said thread, and it will be seen that this two-to-one arrangement, although maintained throughout the switches, changes the disposition of the warp-threads for each succeeding shuttle or weft thread—that is, for the first shuttle-thread Nos. 1 and 2 of each group are in the upper position and No. 3 in the lower position, for the second shuttle Nos. 2 and 3 are in the upper position and No. 1 in the lower position, and for the third shuttle Nos. 1 and 3 are in the upper position and No. 2 in the lower position.

As the disposition of the warp-thread in a two-to-one diagonal repeats itself every three weft-threads it is obvious that the number of shuttles employed must be three or a number divisible by three, as the number of changes in the disposition of the warp-threads is governed by the number of sets of switches and the latter by the number of shuttles employed.

The independent movement of each of the three jacks comprising each group is indicated by the dotted lines $a'\ a^2\ a^3$, showing an imaginary race on the cam-ring which the recesses $B^4\ B^{40}\ B^{41}$ of the corresponding jacks 1 2 3 would follow.

It is obvious that the number of switches and the number of jacks to engage with the several switches, also the disposition of the latter, may be arranged or adjusted to suit the nature of or design of the fabric it is desired to produce.

In order that they may be readily removed and changed, the switches $I^3$, $I^4$, and $i$ are each mounted or formed on a circular stud $c$, provided with a collar $c'$, and fit into correspondingly-shaped recesses in the cam-ring I, where they are secured by screws $c^2$, as shown in Fig. 18. To prevent the studs $c$ from turning round, they may each be provided with a key or projection engaging with a keyway in the recess.

The cam projections $I^5$, $I^6$, and $i'$, which engage with the recesses $B^4$ $B^{40}$ $B^{41}$, Figs. 7, 8, and 21, respectively, of the jacks B, as the nibs $B^2$ of the latter are leaving the double race $I'$, may in this case be mounted on circular sliding studs $d$, secured each set to a plate $d'$, so that they may be withdrawn when the cam-ring is rotated in the reverse direction when it is desired to move all the jacks B into the lower position in order that the shuttles may be removed. With this arrangement I employ a pivoted switch $i^2$, which is normally in a recess in the side of the cam-race, but is mounted on a pivot $i^3$, actuated by a lever-arm $i^4$, so that it may be moved into the position shown in full lines in Fig. 17, and engage with the nibs $B^2$ of the jacks and move them all into the lower of the two races $I'$.

The plates $d'$ of the sliding switches may each be connected to one arm of a bell-crank lever $d^2$, pivoted to a stud on the cam-ring, and the other arms of these levers may all be connected together by flexible connections, so that the whole of the plates $d'$ may be operated simultaneously.

I claim—

1. In a circular loom, the combination with the shuttle, of jacks provided with extensions which carry and propel the shuttle, a ring or rings provided with recesses to receive and support the heads of the extensions, and a cam-ring formed with races for operating the propelling-jacks, the said jacks and cam-races being constructed so that the extensions of the former are distributed by the action of the latter above and below the shuttle during its passage so as to form a temporary race, and their position successively reversed so as to propel the shuttle by their action on its double inclined rear end; substantially as described.

2. In a circular loom, the combination with jacks provided with extensions for carrying and propelling the shuttles, and a cam-ring provided with a cam-groove for operating the said jacks, of rings arranged above and below the cloth-line provided with recesses for receiving and supporting the ends of the jack extensions; substantially as described.

3. In a circular loom, the combination with a cam-ring provided with a single cam-race alternating with a double cam-race, the single race opening out into a double race and the latter returning again into a single race, of shuttle-propelling jacks provided with extensions for carrying and operating the shuttle and with nibs to engage with the cam-race, and with recesses above the nibs on alternate jacks and below the nibs on the remaining jacks, and switches on the cam-ring to engage with the recesses in the jacks, as the nibs of the jacks leave the single race; substantially as described.

4. In a circular loom, the combination with the cam-ring provided with a single cam-race alternating with a double cam-race, the single race opening out into a double race and the latter returning again to a single race, of shuttle-propelling jacks provided with extensions for carrying and operating the shuttle and with nibs to engage with the cam-race, and with recesses above the nibs on alternate jacks and below the nibs on the remaining jacks, and fixed and adjustable switches on the cam-ring to engage with the recesses in the jacks, for moving the whole of said jacks into the lower position when the cam-ring is reversed, in order to admit of the removal of the shuttles; substantially as described.

5. In a circular loom, the combination with the warp-thread-operating jacks, and a cam-ring provided with a cam-race for operating the said jacks, of positively-operated take-up jacks arranged in the angle of the warp-threads, and a cam-ring secured to the warp-jack cam-ring, provided with a cam-race for operating the said take-up jacks; substantially as described.

6. In a circular loom, the combination with the externally-toothed wheel and means for imparting a constant rotary motion thereto, of an internally-toothed wheel surrounding the externally-toothed wheel, the starting and stopping mechanism, means for connecting said mechanism to the internally-toothed wheel, a ball or solid object which may be dropped between the two wheels, mechanism for holding and delivering the ball, weft-stop mechanism, and means for connecting the ball-holding mechanism to the weft-stop mechanism, substantially as described.

7. In a circular loom, the combination with the externally and internally toothed wheels the former of which receives a constant rotary motion, the starting and stopping mechanism and means for connecting said mechanism to the internally-toothed wheel, of a box or chute, a lever for ejecting the ball or solid object, weft-stop mechanism and means for connecting said mechanism to the ejecting-lever substantially as described.

8. In a circular loom, a weft-stop mechanism consisting essentially of a rod the lower end of which is alternately inserted and withdrawn from the shed, a lever to which said rod is pivoted, means for reciprocating the lever, a fulcrum interposed between the two ends of the rod about which it is turned by an unbroken weft-thread, and a lever one end of which forms a striking part to engage with the upper end of the rod when the latter is not turned about its fulcrum by an unbroken weft-thread and means for connecting the other end of the lever to the stopping mechanism substantially as described.

9. In a circular loom the combination with a cam-ring provided with a single cam-race alternate with a double cam-race, the single race opening out into a double race, and the latter returning again into a single race, of a set of three or more switches to each single race, and warp-operating jacks each provided with a nib to engage with the cam-race, and a recess to engage with one of the switches in each set, for producing fancy or patterned fabrics; substantially as described.

RUDOLPH WEISS.

Witnesses:
H. C. SHELDON,
MAURICE BILLSON.